US006061879A

United States Patent [19]

Ericson et al.

[11] Patent Number: 6,061,879

[45] Date of Patent: May 16, 2000

[54] EPOXY TYPE TERMINATION FOR FLEXIBLE FLAT TERMINATION MEMBER

[75] Inventors: Richard J. Ericson, Southington; Dennis J. Rehmer, Bristol; Pedro S. Baranda, Farmington, all of Conn.

[73] Assignee: Otis Elevator Company, Farmington, Conn.

[21] Appl. No.: 09/220,120

[22] Filed: Dec. 23, 1998

[51] Int. Cl.[7] .............................. B66B 7/00; F16G 11/00

[52] U.S. Cl. ............................ 24/304; 24/122.6; 403/268

[58] Field of Search ............................... 24/122.6, 122.3, 24/130, 129 R, 115 R, 115 K, 304; 403/267, 268, 270, 275–278, 298; 29/460, 461; 187/411

[56] References Cited

U.S. PATENT DOCUMENTS

| | | | |
|---|---|---|---|
| 741,605 | 10/1903 | Young | 24/112.6 X |
| 1,461,466 | 7/1923 | Stout | 403/268 X |
| 4,043,690 | 8/1977 | Browne | 403/268 |
| 4,200,768 | 4/1980 | Anhalt et al. | 403/267 X |
| 4,570,753 | 2/1986 | Ohta et al. . | |
| 4,673,309 | 6/1987 | Schlaich | 403/268 X |
| 5,415,490 | 5/1995 | Flory . | |
| 5,526,552 | 6/1996 | De Angelis . | |
| 5,539,960 | 7/1996 | Vanasse et al. . | |
| 5,566,786 | 10/1996 | De Angelis et al. . | |
| 5,611,636 | 3/1997 | Flory | 24/122.6 X |
| 5,855,254 | 1/1999 | Bloche . | |

FOREIGN PATENT DOCUMENTS

| | | |
|---|---|---|
| 1 401 197 | 7/1975 | United Kingdom . |
| PCT/FI97/00823 | 7/1998 | WIPO . |
| PCT/FI97/00824 | 7/1998 | WIPO . |

OTHER PUBLICATIONS

Hanover Fair 1998.

Mooring Line Termination Technology, Jul. 1996/Sea Technology.

*Primary Examiner*—James R. Brittain
*Assistant Examiner*—Robert J. Sandy

[57] ABSTRACT

A termination method and apparatus for a flexible flat rope having a plurality of load bearing cords therein wherein an individual cords are substantially equally tensioned and potted in epoxy around an insert instructed to increase the holding strength of the termination.

34 Claims, 1 Drawing Sheet

EPOXY TYPE TERMINATION FOR FLEXIBLE FLAT TERMINATION MEMBER

BACKGROUND OF THE INVENTION

1. Field of the Invention

The invention relates to the field of termination of tension members for elevators. More particularly, the invention relates to improved method and apparatus for terminating a flexible flat tension member having a plurality of load bearing cords therein for an elevator car lifting assembly.

2. Prior Art

Flexible tension members whether they be flat, round, or other shaped, require termination in order to be useful. Many different types of terminations have been used for each of the distinct types of tension members that have been employed in arts where tension members are needed. Eyes have been woven into round cross-section tension members or created by other materials through which the tension member will pass; ferrules have often been employed to create eyes in tension members; u-bolts and other compression members including plates have also been employed to create eyes in tension members; and adhesive type materials have been used to pot tension members in termination fixtures. Particularly with respect to the elevator art and in each of the prior art type terminations discussed above, it is important to evenly distribute tension among the load carrying components of the tension member. By ensuring that tension is equal among the load carrying components, maximum yield strength is provided. Alternately stated, a condition wherein all of the load bearing elements of the tension member maintain equal tension, the highest breaking strength is obtained since in order for the tension member to break, all of the elements must fail at the same time. Where the load bearing components of the tension member are not equally tensioned, some of the load bearing components will be overtensioned while others will be undertensioned. The result of this condition is that the total breaking strength of the rope may be reduced where the load placed upon only some of the load bearing components exceeds those components' yield strength. Possible degradation may result in such a situation. At a lower degree of tension than the tension for which the member is rated. Thus, tension members particularly in the elevator art are conventionally terminated with substantially equal loading on the load bearing components. Since most systems employing tension members are engineered for economy, any significant reduction in the maximum yield strength of the member is undesirable. Unequal loading would require that a much stronger and more costly tension member be employed in a particular system than would otherwise be required or prudent simply because of the unequal loading. Thus, it is highly desirable to create a termination that equally loads all load bearing components of a particular tension member.

In addition to creating an equally distributed load bearing arrangement it is further important to ensure that the load bearing components of the tension member do not slip in the termination either relative to each other or relative to the termination member collectively the results of both are undesirable. Load distribution in round ropes, generally steel, can be achieved by such means as compression, bonding materials and weaving. Unfortunately, the known means for effecting such terminations are not advantageously applicable for flexible flat ropes having small cross section cords and polymeric jackets. With respect specifically to prior art epoxy type terminations, a steel rope would be rosetted reselected and epoxied in a socket. Because of the diameter of the steel strands, such a method is highly effective. In flat ropes having very small diameter cords, a rosette is not sufficiently effective. Thus, the art is need of such a termination.

SUMMARY OF THE INVENTION

The above-identified drawbacks of the prior art are overcome or alleviated by the epoxy potted termination apparatus and method of the invention.

In the invention, the above identified drawbacks of the prior art are avoided by an epoxy (or other material) potting system for a flexible flat tension member having a plurality of load bearing cords. The system employs an insert which functions to route individual cords in a predetermined regular pattern providing cord receiving openings and a specific geometry intended to increase the holding power of the adhesive resin employed to hold the tension member in the termination. A socket is also provided which will receive the insert after the insert is strung (or laced) with the individual cords of the tension member. An adhesive material, preferably epoxy, is then applied to the receiving opening in the socket for the insert and all of the cords, insert and socket are permanently bonded together the cords being affixed in a condition where a substantially equal load is applied to each cord.

BRIEF DESCRIPTION OF THE DRAWINGS

Referring now to the drawings wherein like elements are numbered alike in the several FIGURES.

DETAILED DESCRIPTION OF THE INVENTION

Initially, it is noted that the termination device of the invention is directed primarily to a flexible flat tension member of the type disclosed in U.S. Ser. No. 09/031,108 filed Feb. 26, 1998 Entitled Tension Member For An Elevator and Continuation-In-Part Application Entitled Tension Member For An Elevator filed Dec. 22, 1998 under Attorney Docket No. 98-2143, both of which are entirely incorporated herein by reference.

Figure 1:
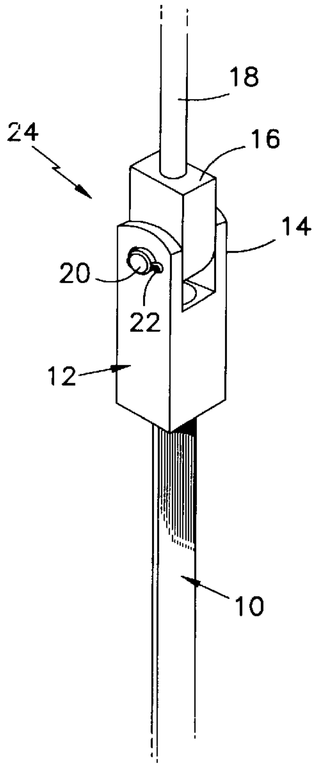
FIG. 1 is a perspective view of a terminated tension member illustrating the tension member, the socket and a pivotal connection for the termination.

Referring to FIG. 1, the invention is illustrated in the terminated form with the flexible flat tension member 10 being terminated to the socket termination member 12. Socket 12 is first inserted over the end of tension member 10 since it must be brought to the end of tension member 10 after cords from the tension member are engaged with insert 30.

Socket 12 includes a clevis end 14 for pivotally receiving a connector 16 that is connected by conventional means 18 to an elevator car (not shown). Clevis 14 includes pivot pin 20 and retainer 22, the pivot being intended to reduce bending stress at the end of the tension member 10 where such member contacts the termination apparatus 24.

Figure 3:
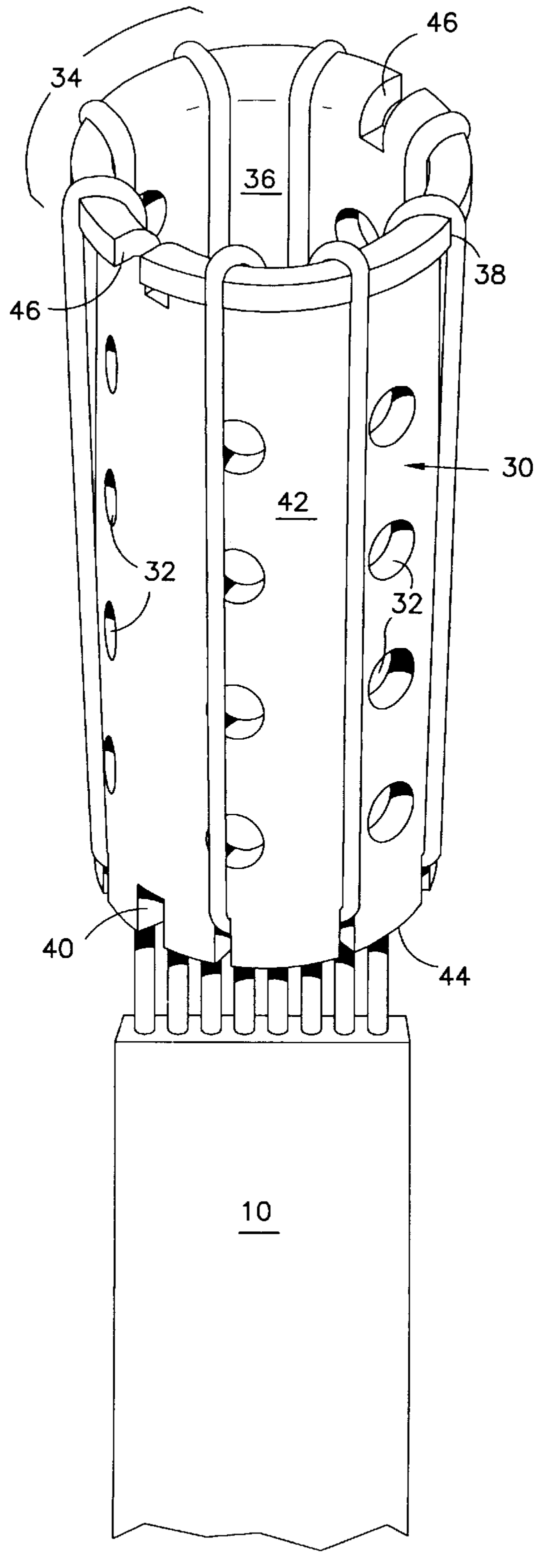
FIG. 3 is a perspective view of the insert engaged with the cords of the tension member.
Figure 2:
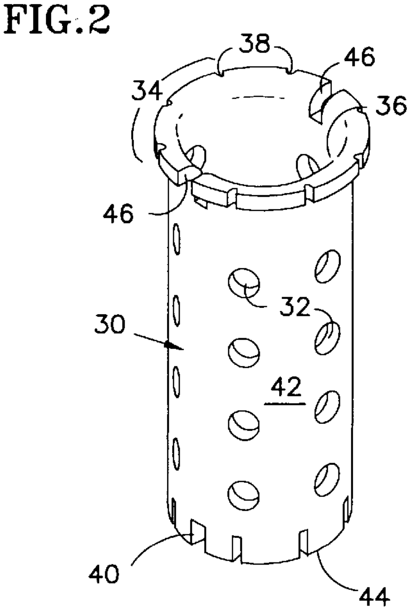
FIG. 2 is a perspective view of an insert of the invention providing an understanding of the geometry thereof as well as the ordered pattern of cord receiving openings.

Referring to FIG. 2 and FIG. 3, the insert 30 of the invention is illustrated in perspective view. One of skill in the art will recognize a plurality of through holes 32 which surround the geometric shape of insert 30. The holes 32 function, for their recognized purpose as used in the prior art, to allow epoxy or other sealing material to flow therethrough ensuring a full potting of the insert 30 and consequently the terminated end of the tension member 10. At the end of the insert 30 which is distal from the tension member 10 and at the top of FIG. 2 is curved section 34. Curved section 34 begins at an inside surface 36 of insert 30 and bends approximately 90° over a radius of approximately 5 millimeters. The radius can be in a range of 2 millimeters to 25 millimeters and is selected to facilitate 180° bending of individual cords from tension member 10 without kinking the same. Moreover, the surface area provided by the radius increases friction on each of the cords of tension member 10 thereby increasing the holding power of the termination. Along the outer edge of curved section 34 are a plurality of slots 38 each spaced out to provide a regular pattern of slots. The number of slots provided should equal the number of cords within flat tension member 10.

Each of the slots 38 should be sized preferably to slightly pinch the cord that is to be received therein. This is in order to maintain the cord under slight tension while the adhesive or epoxy is flowed into the termination device. By so maintaining the cords in the slightly tensioned condition, there will be a high degree of confidence that the tension provided in each of the cords will be substantially equal.

Subsequent to passing through the central axis of insert 30, and through individual slots 38, the cords are drawn downwardly (in the Figure) and into more proximity with a body 42 of insert 30. The cords are laced through corresponding slots on the proximate end of the insert member 10 (bottom of FIG. 2) to slot 40 (item 40 could also be clips or other means to hold the end of the cords). The cords preferably are inserted through slot 40 with the free end being located within the hollow central section of insert 30. An astute artisan skilled in termination will note that the curved section 34 not only provides a radius over which the cords may smoothly pass but also spaces the cord from the body 42 of insert 30. The cords do not touch the body 42 of insert 30 after passing through slots 38 until they pass through slots 40. Thus the cords will be spaced from body 42 in a manner that will promote full encapsulation of the individual cords by the epoxy material.

It should be appreciated that the insert also effectively causes two 180° bends in each cord thereby dramatically increasing the friction of the cords on the insert and adding to the effective shear strength of the termination over that supplied by the epoxy. The arrangement ensures that the individual cords will not pull through the epoxy and therefore provides a reliable termination for the flat tension member 10.

It should also be noted that the "bottom" 44 of insert 30, is preferably of an oval shape. The oval shape more closely coincides with the flat profile of a flat tension member and thus better receives the cords of such tension member.

In use, the tension member 10 would be stripped at its terminal end about 6.3 inches, however it should be appreciated that this length is related to a 30 millimeter wide tension member and would be adjusted in different width members. In general, as the tension member gets wider the length of stripped cords would be longer. The free cords, exposed by stripping off the elastomer on the flat tension member 10 are fed through the insert 30 from the bottom 44 of FIG. 2 until the unstripped portion of the tension member 10 is about even with bottom 44 of insert 30. The individual cords should be stripped back to be long enough to extend through insert 30 so that they can be laced individually into slots 38, drawn down spaced from the outside surface of insert 30 individually and laced in slots 40. The free ends of the cords are then allowed to terminate on the interior portion of insert 30.

When insert 30 is properly wired, socket 12 is brought into engagement with insert 30 and epoxy material or other suitable adhesive material is applied to insert 30 and socket 12 to permanently affix the two portions together. By so permanently affixing the wired insert 30 and socket 12 the member 10 is permanently terminated in a reliable manner.

In an optional feature of the invention, notches 46 (FIG. 2) are provided to align the insert 30 with the socket 12. The feature assists in aligning the insert 30 in the socket to keep the tension member properly oriented. Notches 46 would engage projections in socket 12 for such alignment when this optional feature is employed.

What is claimed is:

1. A tension member termination device comprising:

a socket;

an insert having slots at a top and bottom thereof, said slots being sized to accept a single cord of a plurality of cords of a tension member to be terminated; and a potting material to bond said plurality of cords, said insert and said socket together.

2. A tension member as claimed in claim 1 wherein said insert has a structure which causes a cord laced therethrough to remain spaced from an outside surface of said insert.

3. A tension member as claimed in claim 2 wherein said structure is a flared end of said insert.

4. A tension member as claimed in claim 1 wherein said insert includes a plurality of through passages to flow the potting material to the socket.

5. A tension member as claimed in claim 1 wherein said slots are sized to pinch laced cords of said plurality of cords.

6. A tension member as claimed in claim 1 wherein said potting material is epoxy.

7. A tension member as claimed in claim 1 wherein said insert is of a cylindrical geometric shape defined by an oval base and a circular top.

8. A method for terminating a tension member comprising:

inserting a terminal end of said tension member in a socket;

stripping said terminal end of said tension member to expose a plurality of individual cords;

lacing individual ones of said plurality of cords through an insert having cord receiving slots;

placing said insert in a laced condition into said socket;

applying a potting material to said insert and socket to permanently anchor said plurality of cords.

9. A method for terminating a tension member comprising:

inserting a terminal end of said tension member in a socket;

stripping said terminal end of said tension member to expose a plurality of individual cords;

lacing individual ones of said plurality of cords through an insert having cord receiving slots, wherein said lacing includes:

inserting said plurality of cords through said insert; and bending said cords over a top of said insert so that a free end of each of said cords points back toward the tension member;

placing said insert in a laced condition into said socket;

applying a potting material to said insert and socket to permanently anchor said plurality of cords.

10. A method as claimed in claim 9 wherein said lacing further includes bending said cords so that the free end of each cord is within an axial opening of said insert.

11. A method for terminating a tension member comprising:

inserting a terminal end of said tension member in a socket;

stripping said terminal end of said tension member to expose a plurality of individual cords;

lacing individual ones of said plurality of cords through an insert having cord receiving slots, wherein said lacing includes substantially equally tensioning said plurality of cords;

placing said insert in a laced condition into said socket;

applying a potting material to said insert and socket to permanently anchor said plurality of cords.

12. A tension member termination device comprising:

a socket;

a tensioner nestable in said socket, said tensioner being capable of maintaining tension on individual cords of a tension member being terminated; and a potting material to bond said tensioner and said cords in said socket.

13. A termination for a tension member comprising:

a socket;

an insert nestable in said socket, said insert facilitating a bend in at least one of a plurality of cords of said tension member to increase effective holding force on said at least one of said plurality of cords;

a potting material to bond said socket, insert and plurality of cords together.

14. A termination according to claim 13 wherein said bend is about 180°.

15. A termination for a tension member comprising:

a socket;

a potting material to bond said socket and a plurality of cords of said tension member said potting material providing shear strength to said cords;

an insert nestable with said socket and engageable with said socket and said plurality of cords to increase said shear strength.

16. A tension member for an elevator system, the elevator system including a car engaged with the tension member, the tension member including:

a plurality of individual load carrying cords;

a layer of coating, the coating layer separating the cords; and a termination device including:

a tensioner engageable with the cords, the tensioner capable of maintaining tension on each of the individual cords of the plurality of cords; and potting material engaged with the cords.

17. The tension member according to claim 16, wherein the tensioner is capable of maintaining substantially equal tension in each of the individual cords.

18. The tension member according to claim 16, wherein the tensioner is configured to retain the individual cords such that the separation between the plurality of cords is maintained.

19. The tension member according to claim 16, wherein the tensioner further includes a plurality of openings, wherein each of the openings is adapted to receive one of the plurality of cords to retain the cord.

20. The tension member according to claim 19, wherein the openings include a plurality of slots disposed at one end of the tensioner, with each slot sized to retain one cord.

21. The tension member according to claim 20, wherein each slot is sized to pinch each of the cords.

22. The tension member according to claim 20, further including a second plurality of slots disposed at the opposite end of the tensioner.

23. The tension member according to claim 16, wherein the tensioner facilitates a bend in at least one of the cords to increase effective holding force on the at least one cord.

24. The tension member according to claim 23, wherein the bend in the cord is approximately 180 degrees.

25. The tension member according to claim 23, wherein the tensioner includes a curved portion to facilitate bending of the cord.

26. The tension member according to claim 16, wherein the ability of the termination to resist pulling out of the cords is defined at least in part by the shear strength of the termination device, and wherein the shear strength of the termination device is provided by both the potting material and the tensioner.

27. The tension member according to claim 16, wherein the tension member has shape defined by an aspect ratio, defined as the ratio of width w relative to thickness t, greater than one, and wherein the tensioner is of a geometrical shape to accommodate the shape of the tension member.

28. The tension member according to claim 27, wherein the tensioner is of a generally cylindrical geometric shape having an oval base and a circular top.

29. The tension member according to claim 16, wherein the tensioner is configured to maintain separation between each of the cords and other objects to promote full encapsulation of the individual cords by the potting material.

30. An elevator system including:

a car; and a tension member engaged with the car, the tension member including:

a plurality of individual load carrying cords;

a layer of coating, the coating layer separating the cords; and a termination device including:

a tensioner engageable with the socket and the cords, the tensioner capable of maintaining tension on each of the individual cords of the plurality of cords; and potting material engaged with the cords.

31. A method for terminating a tension member, the tension member including a plurality of load-carrying cords within a coating layer, the method comprising:

exposing the plurality of individual cords;

lacing individual ones of said plurality of cords through tensioner having cord receiving slots, wherein each slot is sized to receive a single cord;

applying a potting material to said tensioner to permanently anchor said plurality of cords.

32. A method as claimed in claim 31 wherein said lacing includes:

inserting said plurality of cords through said tensioner;

bending said cords over a top of said tensioner so that a free end of each of said cords points back toward the tension member.

33. A method as claimed in claim 32 wherein said lacing further includes bending said cords so that the free end of each cord is within an axial opening of said tensioner.

34. A method as claimed in claim 31 wherein said lacing includes substantially equally tensioning said plurality of cords.

* * * * *

UNITED STATES PATENT AND TRADEMARK OFFICE

CERTIFICATE OF CORRECTION

PATENT NO. : 6,061,879
DATED : May 16, 2000
INVENTOR(S) : Ericson et al.

It is certified that error appears in the above-identified patent and that said Letters Patent is hereby corrected as shown below:

On the title page, please add inventor to item [75],

--Hugh J. O'Donnell, Londmeadow, Massachusetts --.

Signed and Sealed this

Twenty-seventh Day of February, 2001

Attest:

Nicholas P. Godici

NICHOLAS P. GODICI

*Attesting Officer* *Acting Director of the United States Patent and Trademark Office*